(12) United States Patent
Petzen et al.

(10) Patent No.: US 10,094,370 B2
(45) Date of Patent: Oct. 9, 2018

(54) SYSTEMS AND METHODS FOR PROVIDING OVERRIDE CONTROL FOR A FEEDWATER PUMP RECIRCULATION VALVE

(71) Applicant: General Electric Company, Schenectacy, NY (US)

(72) Inventors: John Petzen, Salem, VA (US); Gautam Chatterji, Schenectacy, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/383,466

(22) Filed: Dec. 19, 2016

(65) Prior Publication Data
US 2017/0292512 A1    Oct. 12, 2017

Related U.S. Application Data (62) Division of application No. 13/747,986, filed on Jan. 23, 2013, now Pat. No. 9,558,854.

(51) Int. Cl.
*F04B 49/06*    (2006.01)
*F04B 49/24*    (2006.01)
(Continued)

(52) U.S. Cl.
CPC ............ *F04B 49/065* (2013.01); *F04B 49/24* (2013.01); *F04D 15/0011* (2013.01); *F22D 5/20* (2013.01);
(Continued)

(58) Field of Classification Search
CPC ........ G21C 7/36; F04D 15/0011; F22D 11/02
See application file for complete search history.

(56) References Cited

U.S. PATENT DOCUMENTS 6,354,805 B1    3/2002  Moller
6,468,042 B2    10/2002 Moller
(Continued)

FOREIGN PATENT DOCUMENTS

CN    1179134 C    12/2004
JP    54140003 A   10/1979
(Continued)

OTHER PUBLICATIONS

Unofficial English Translation of Chinese Office Action issued in connection with corresponding CN Application No. 201410031299.7 dated Jul. 15, 2016.
(Continued)

*Primary Examiner* — Jack W Keith
*Assistant Examiner* — Lily Crabtree Garner
(74) *Attorney, Agent, or Firm* — Eversheds-Sutherland (US) LLP (57) ABSTRACT

Systems and methods for providing override control for a feedwater pump recirculation valve are provided. According to one embodiment, a system may include a controller and a processor communicatively coupled to the controller. The processor may be configured to receive one or more measurements associated with pump motor power driving feedwater pump flow. The feedwater pump recirculation valve may be configured to maintain a predetermined minimum recirculation flow through the feedwater pump by regulating recirculation pump flow through a recirculation line. The processor may be also configured to calculate, based at least in part on the one or more measurements, the recirculation pump flow, and compare the recirculation pump flow to the predetermined minimum recirculation flow. Based at least in part on the comparing, the processor may selectively provide an override control signal to the feedwater pump
(Continued)

recirculation valve to selectively modify the recirculation pump flow.

12 Claims, 6 Drawing Sheets

(51) Int. Cl.
    *F22D 5/26* (2006.01)
    *F22D 5/34* (2006.01)
    *F22D 11/02* (2006.01)
    *F22D 11/06* (2006.01)
    *G21C 7/36* (2006.01)
    *F04D 15/00* (2006.01)
    *F22D 5/20* (2006.01)

(52) U.S. Cl.
    CPC ............ *F22D 5/26* (2013.01); *F22D 5/34* (2013.01); *F22D 11/02* (2013.01); *F22D 11/06* (2013.01); *G21C 7/36* (2013.01); *F04B 2203/0208* (2013.01); *F04B 2205/09* (2013.01)

(56) References Cited

U.S. PATENT DOCUMENTS

| | | |
|---|---|---|
| 2002/0170349 A1 | 11/2002 | Soneda et al. |
| 2002/0176783 A1 | 11/2002 | Moeller |
| 2010/0236241 A1 | 9/2010 | Kumar et al. |

FOREIGN PATENT DOCUMENTS

| | | |
|---|---|---|
| JP | S56-140706 U | 10/1981 |
| JP | S58-195097 A | 11/1983 |
| JP | S59-74405 A | 4/1984 |
| JP | 01114603 A | 5/1989 |
| JP | 01281303 A | 11/1989 |

OTHER PUBLICATIONS

European Search Report and Opinion issued in connection with corresponding EP Application No. 14151401.8 dated Jun. 10, 2014.
Machine translation and Notification of Reasons for Refusal issued in connection with corresponding JP Application No. 2014-008185 dated Dec. 5, 2017.

FIG. 6

SYSTEMS AND METHODS FOR PROVIDING OVERRIDE CONTROL FOR A FEEDWATER PUMP RECIRCULATION VALVE

CROSS-REFERENCE TO RELATED APPLICATIONS

This application is a divisional of U.S. application Ser. No. 13/747,986, filed Jan. 23, 2013, allowed, entitled "Systems and Methods for Providing Override Control for a Feedwater Pump Recirculation Valve," the contents of which are hereby incorporated by reference in their entirety.

TECHNICAL FIELD

This disclosure relates generally to feedwater pump control systems, and more particularly, to systems and methods for providing override control for a feedwater pump recirculation valve.

BACKGROUND

A feedwater pump can be used to supply feedwater into a steam boiler. To protect the feedwater pump from damaging conditions during operation, a flow through the feedwater pump is maintained above a recommended minimum value. The recommended minimum value can be met by having a minimum flow recirculation valve recirculate water in the pump as needed. The minimum flow recirculation valve is conventionally controlled based on measurements of the feedwater pump delivery pressure or flow.

A conventionally used flow measurement technique in industrial applications is calculation of the fluid flow rate based on readings of the pressure loss across a pipe restriction using a differential-pressure flowmeter. Differential-pressure flowmeters can rely upon a pressure connection on both sides of a flow element, such as an orifice plate or venturi flow nozzle. The connections are called impulse lines, and typically contain root isolation valves at the piping connection to the main feedwater piping. If these impulse lines become partially or completely blocked by corrosion products or an incorrectly positioned root valve, the flow indication may be incorrect. If the flow indication reads higher than the actual flow, the recirculation valve control loop may act based on the incorrect flow reading, causing the recirculation valve to close to a position that allows less flow through the pump than the recommended minimum, and pump damage can occur.

BRIEF DESCRIPTION OF THE DISCLOSURE

The present disclosure relates to systems and methods for providing override control for a feedwater pump recirculation valve. According to one embodiment, a method can be provided. The method can include receiving one or more measurements associated with pump motor power driving feedwater pump flow, wherein the feedwater pump recirculation valve may be configured to maintain a predetermined minimum recirculation flow through the feedwater pump by regulating recirculation pump flow through a recirculation line, based at least in part on the one or more measurements, calculating the recirculation pump flow, and comparing the recirculation pump flow to the predetermined minimum recirculation flow. Based at least in part on the comparing, an override control signal to the feedwater pump recirculation valve may be provided to selectively modify the recirculation pump flow.

According to one embodiment, a system may include a controller configured to control a feedwater pump and a processor communicatively coupled to the controller. The processor may be configured to receive one or more measurements associated with pump motor power driving feedwater pump flow. The feedwater pump recirculation valve may be configured to maintain a predetermined minimum recirculation flow through the feedwater pump by regulating recirculation pump flow through a recirculation line. The processor may also be configured to calculate, based at least in part on the one or more measurements, the recirculation pump flow, and to compare the recirculation pump flow to the predetermined minimum recirculation flow. Based at least in part on the comparing, the processor may selectively provide an override control signal to the feedwater pump recirculation valve to selectively modify the recirculation pump flow.

In one embodiment, another system may be provided. The system may include a feedwater pump, a controller configured to control the feedwater pump, and a processor communicatively coupled to the controller. The processor may be configured to receive one or more measurements associated with pump motor power driving feedwater pump flow. The feedwater pump recirculation valve may be configured to maintain a predetermined minimum recirculation flow through the feedwater pump by regulating recirculation pump flow through a recirculation line. The processor may also be configured to calculate, based at least in part on the one or more measurements, the recirculation pump flow, and to determine, based at least in part on a signal provided by a differential-pressure flowmeter, that recirculation pump flow is above the predetermined minimum recirculation flow whereas the calculated recirculation pump flow based at least in part on the one or more measurements is below the predetermined minimum recirculation flow. Based at least in part on the determining, the processor may provide an override control signal to the feedwater pump recirculation valve to increase the recirculation flow above the predetermined minimum recirculation flow.

Other embodiments and aspects will become apparent from the following description taken in conjunction with the following drawings.

DETAILED DESCRIPTION

The following detailed description includes references to the accompanying drawings, which form part of the detailed description. The drawings include illustrations in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

The embodiments described herein relate to systems and methods for providing override control for a feedwater pump recirculation valve. When the feedwater pump is in operation, the pressure of the fluid passing through the pump is increased. The temperature of the fluid increased due to mechanical contact with the feedwater pump. If the flow rate of the fluid passing through the pump is too low the pump may overheat. To prevent or otherwise minimize overheating, many pumping systems use minimum recirculation piping to direct part or all of the pump discharge flow back upstream of the pump where the flow is cooled before returning to the pump. Some power plants include minimum flow recirculation piping for feedwater pumps. The recirculation flow may be sent to the deaerator or condenser. During plant startup or shutdown, the demand for feedwater may be low. The control valve associated with the minimum flow recirculation piping may open to direct the flow back upstream. During normal operation, the demand for feedwater may be higher and the minimum flow recirculation valve is closed. The minimum flow recirculation valve may automatically protect feedwater pumps during low load operations. As the pump load drops below a predetermined minimum flow rate, the recirculation valve may cause the bypass bush to open a bypass flow path. The pump minimum flow rate is thus reached and maintained.

The minimum flow recirculation valve may be controlled by measuring fluid flow rate through the feedwater pump. Conventionally, differential-pressure type flowmeters have been widely used in flow measurement techniques. In general, differential-pressure flowmeters may rely upon a pressure connection on both sides of a flow element, such as an orifice plate or venturi flow nozzle. The connections can be called impulse lines, and typically contain root isolation valves at the piping connection to the main feedwater piping.

However, during commissioning, significant amounts of corrosion products may be produced in power plant piping. If the impulse lines become partially or completely blocked by corrosion products or an incorrectly positioned root valve, the flow indication may be incorrect. If the flow indication reads higher than actual flow, a recirculation valve control loop may act based on the incorrect flow reading causing the recirculation valve to close to a position that allows less flow through the pump than the minimum required to prevent or otherwise minimize pump damage.

In accordance with an embodiment of the disclosure, the pump motor power may be used to calculate actual developed flow through the feedwater pump to provide an override control signal to the feedwater pump recirculation valve if the pump power consumed indicates that flow through the feedwater pump is below a design minimum flow.

Actual pump motor power may be detected by a smart motor control center (e.g., a GE Multilin MM300) and transmitted to a control system. Alternatively, pump current and voltage may be detected by current and potential transformers directly connected to control system I/O cards and calculated in the control system. The pump motor power may be converted into flow by using an interpolation function in the control system preprogrammed with the pump characteristic curve of power versus flow, typically as supplied by the pump vendor. The flow calculated by the interpolation function may be compared to a minimum pump flow per vendor specifications. If the flow is below the minimum flow setpoint, the loop controller for the feedwater pump recirculation valve may receive an override control signal, and shifts from using the flow from the differential pressure flow instrument to using the flow calculated from the pump power.

The technical effects of certain embodiments of the disclosure may include preventing damage to a feedwater pump by detecting incorrect flow readings based on a redundant backup minimum flow indication that is not susceptible to impulse line plugging failure modes.

Figure 1:
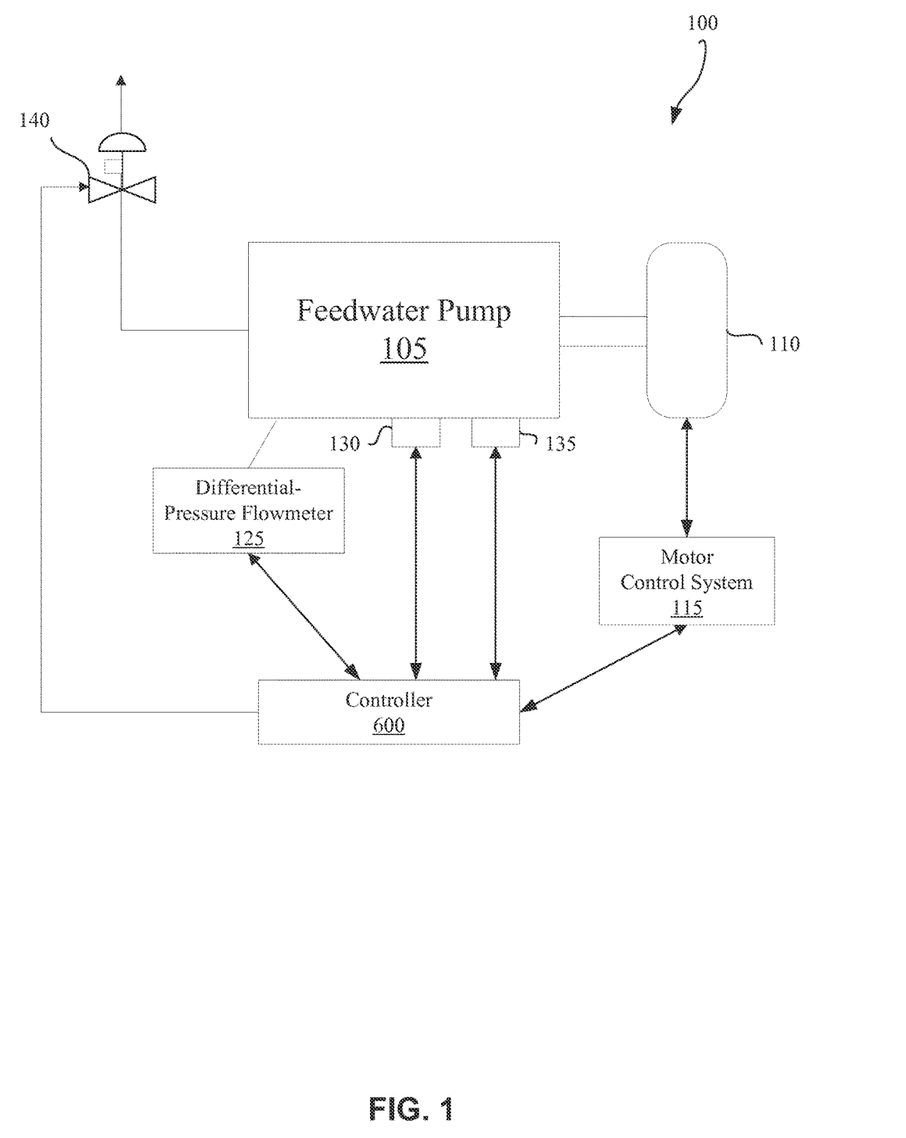
FIG. 1 depicts a simplified block diagram illustrating an example environment and a system in accordance with an embodiment of the disclosure.

Referring now to FIG. 1, a block diagram illustrates a system environment 100 suitable for providing override control for a feedwater pump recirculation valve, in accordance with one or more example embodiments. In particular, the system environment 100 may comprise a feedwater pump 105, a pump motor 110, a motor control system 115, a controller 600, a differential-pressure flowmeter 125, a current transformer 130, a potential transformer 135, and a feedwater pump recirculation valve 140.

The feedwater pump 105 may be driven by the pump motor 110 to supply feedwater from a deaerator (not shown) to a boiler (not shown). The differential-pressure flowmeter 125 may be configured to measure recirculation flow through the feedwater pump 105 and to provide a signal indicative of the measurements to the controller 600. The motor control system 115 may be coupled to the pump motor 110 and configured to measure the pump motor power and transmit the measurements to the controller 600.

In accordance with one example embodiment, the pump motor power may be detected by one or more transformers connected to the motor control system 115. The one or more transformers may include a current transformer 130, a potential transformer 135, and so forth. The feedwater pump recirculation valve 140 may be configured to regulate recirculation flow through the feedwater pump 105.

The operations of the feedwater pump 105 may be managed by the controller 600. The controller 600 may interact with the differential-pressure flowmeter 125 to receive measurements associated with pressure drops, fluid levels, flow rates and so forth. The controller 600 may also interact with the motor control system 115 to receive a feedback associated with power consumption in the pump motor 110.

In accordance with one example embodiment, the pump motor power may be measured by transformers connected to the motor control system 115. For example, feedwater pump current and voltage may be detected by current and potential transformers 130, 135 connected to the controller input/output (I/O) cards and calculated by the controller 600.

During pump operation, flow may be constantly measured by a differential-pressure flowmeter 125 and corresponding signals sent to the controller 600. When it is determined that the flow rate drops below a predetermined minimum recirculation flow recommended by a pump manufacturer, an alarm signal may be sent to the controller 600 to prevent or otherwise minimize possible pump damage. However, there may be instances, when the differential-pressure flowmeter 125 shows an incorrect flow reading due to an impulse line plugging failure in feedwater piping. Therefore, in order to assure the correct feedwater pump operation, an override control of the feedwater pump recirculation valve 140 based on electrical power measurements may be provided. In particular, if the measured power indicates that recirculation flow through the feedwater pump 105 is below a predetermined minimum recirculation flow, the controller 600 may send an override control signal to the feedwater pump recirculation valve 140, which causes the recirculation valve 140 to open and allow more flow to the feedwater pump 105. This, in turn, will increase pump motor power and raise the flow above the predetermined minimum flow. Thus, flow calculations based on the pump motor power may allow verifying measurements reported by the differential-pressure flowmeter 125.

In accordance with one example embodiment, the controller 600 may be configured to manage the operation of the feedwater pump recirculation valve 140 by providing an override control signal to modify the recirculation flow. For example, the override control signal may cause the feedwater pump recirculation valve 140 to increase or decrease the recirculation flow through the feedwater pump 105. The feedwater pump recirculation valve 140 may also include a loop controller (not shown) that regulates the operation of the feedwater pump recirculation valve 140.

An operator may interact with the controller 600 via a user interface device, such as a keyboard, a mouse, a control panel, or any other device capable of communicating data to and from the controller 600.

Figure 2:
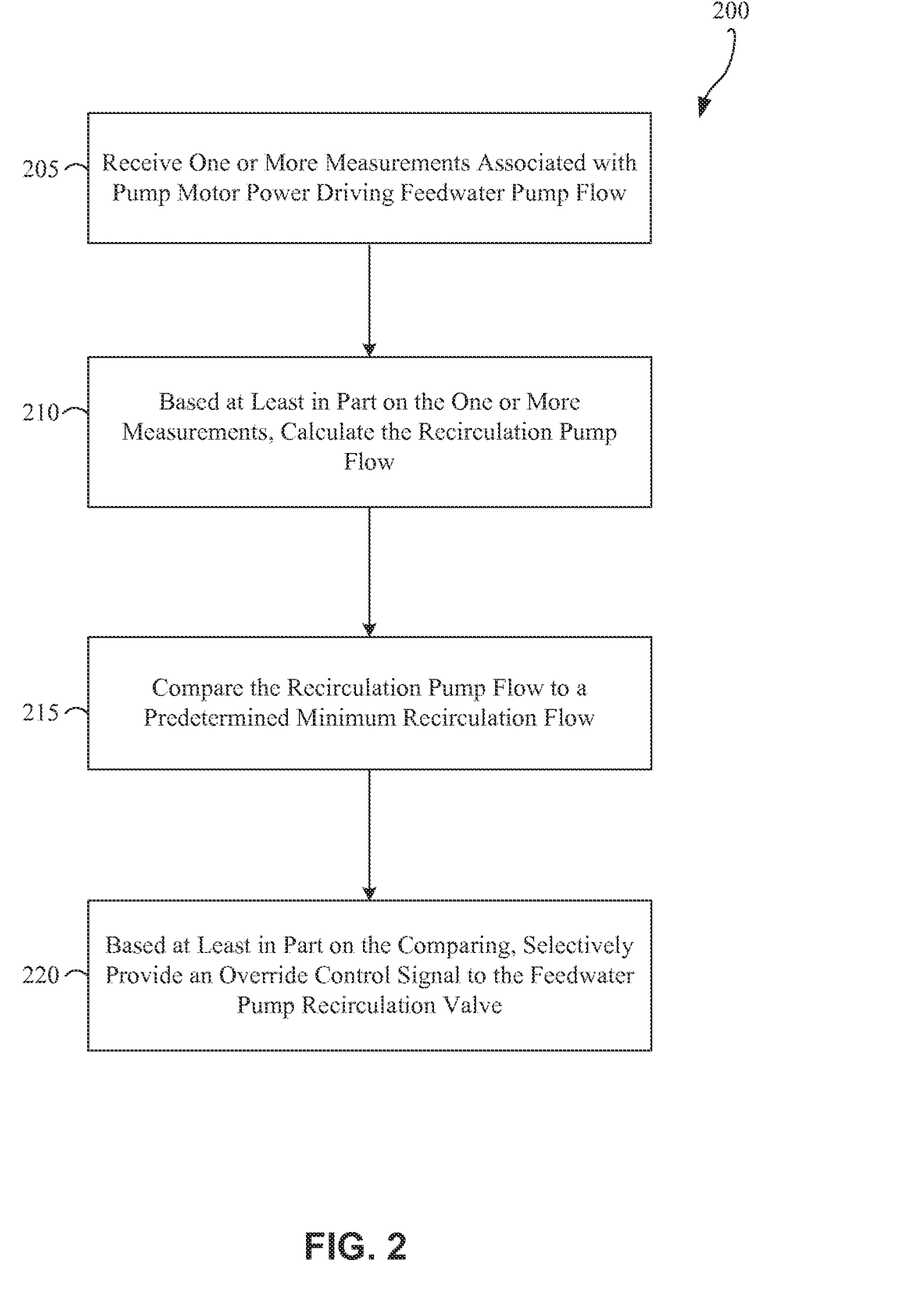
FIG. 2 depicts a process flow diagram illustrating an example method for providing override control for a feedwater pump recirculation valve, in accordance with an embodiment of the disclosure.

FIG. 2 depicts a process flow diagram illustrating an example method 200, in accordance with an embodiment of the disclosure. The method 200 may be performed by processing logic that comprises hardware (e.g., dedicated logic, programmable logic, and microcode), software (such as software run on a general-purpose computer system or a dedicated machine), or a combination of both. In one example embodiment, the processing logic may reside at the controller 600, which may, in turn, reside in a user device or in a server. The controller 600 may comprise processing logic. It will be appreciated by one of ordinary skill in the art that instructions said to be executed by the controller 600 may, in fact, be retrieved and executed by one or more processors. The controller 600 may also include memory cards, servers, and/or computer discs. Although the controller 600 may be configured to perform one or more steps described herein, other control units may be utilized while still falling within the scope of various embodiments.

As shown in FIG. 2, the method 200 may commence in operation 205 with receiving one or more measurements associated with pump motor power driving feedwater pump flow. The feedwater pump recirculation valve may be configured to maintain a predetermined minimum recirculation flow through the feedwater pump by regulating recirculation pump flow through a recirculation line. The pump motor power may be detected by a motor control system. In accordance with one example embodiment, the pump motor power may be detected by one or more transformers connected to the motor control system. For example, the one or more transformers may include a current transformer or a potential transformer.

In operation 210, the recirculation pump flow may be calculated, based at least in part on the one or more measurements of the pump motor power. An interpolation function may be utilized to calculate the feedwater pump flow. The pump motor power may be correlated to the flow by using the interpolation function. The interpolation function may be stored in the memory of the controller preprogrammed with a characteristic curve of power versus flow, typically as provided by the pump manufacturer. The interpolation function may include a cubic interpolation function.

In operation 215, the recirculation pump flow may be compared to the predetermined minimum recirculation flow. The minimum recirculation flow may depend on the pump design and the safety requirements of the plant and may be specified by a pump manufacturer.

In operation 220, based at least in part on the comparing, an override control signal may be selectively provided to the feedwater pump recirculation valve to modify the recirculation pump flow. For example, if the calculated recirculation flow is below the predetermined minimum recirculation flow, the override control signal may be provided to the loop controller of the feedwater pump recirculation valve to increase the recirculation flow above the predetermined minimum recirculation flow. Such an increase may help to avoid overheating and further damage of the feedwater pump. The override control signal may be used to override a signal provided by a differential-pressure flowmeter associated with the feedwater pump recirculation valve. When the signal provided by the differential-pressure flowmeter indicates that the recirculation flow is above the predetermined minimum recirculation flow, whereas the recirculation flow is below the predetermined minimum recirculation flow based on the one or more measurements, the override control signal may be provided to the feedwater pump recirculation valve to increase the recirculation flow above the predetermined minimum recirculation flow.

Figure 3:
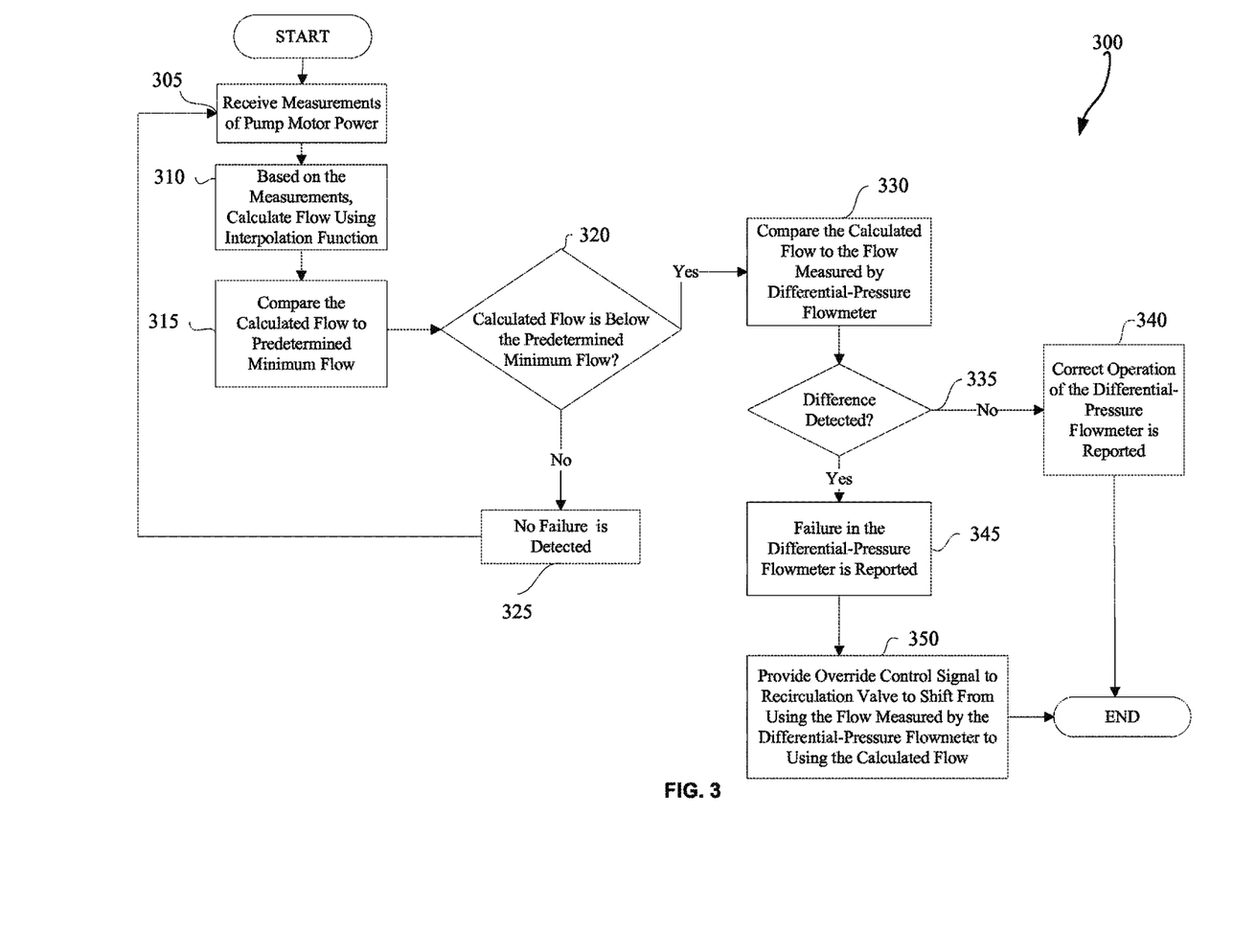
FIG. 3 depicts a process flow diagram illustrating a detailed example method for providing override control for a feedwater pump recirculation valve, in accordance with an embodiment of the disclosure.

FIG. 3 depicts an example method 300 for providing override control for a feedwater pump recirculation valve, in accordance with an embodiment of the disclosure. Pump motor power may be used to determine an actual flow through a feedwater pump. In operation 305, one or more measurements associated with pump motor power driving the feedwater pump flow may be received by a controller. The pump motor power may be detected by a motor control system. In accordance with one example embodiment, the pump motor power may be detected by one or more transformers connected to the motor control system.

In operation 310, the received pump motor power may be used to calculate the actual recirculation pump flow through the feedwater pump. The calculation may be performed using an interpolation function. The flow calculated by the interpolation function may be then compared to a predetermined minimum recirculation flow in operation 315. If it is determined, in operation 320, that the calculated flow is above the predetermined minimum recirculation flow, in operation 325, it may be reported that the feedwater pump is operating under safe conditions. However, if it is determined that the calculated flow is below the predetermined minimum recirculation flow, the recirculation flow may be compared to a measured recirculation flow, as determined by a differential-pressure flowmeter, in operation 330, to check whether the calculated flow properly correlates to the flow as measured by the differential-pressure flowmeter.

The signal provided by the differential-pressure flowmeter may indicate that the recirculation flow is above the predetermined minimum recirculation flow, whereas the recirculation flow is below the predetermined minimum recirculation flow based on the one or more measurements associated with the pump motor power. In this case, the recirculation valve control loop may act based on the incorrect flow reading causing the recirculation valve to move to a position that allows less flow through the pump than the predetermined minimum recirculation flow required to prevent or otherwise minimize pump damage.

Thus, upon detection of difference between the flow calculated based on the pump motor power and the flow measured by the differential-pressure flowmeter, in operation 335, failure in the operation of the differential-pressure flowmeter may be reported in operation 345. The controller may then provide, in operation 350, an override control signal to the feedwater recirculation valve to modify the recirculation flow, i.e., transition from using the flow measured by the differential-pressure flowmeter to using the calculated flow. In particular, the override control signal may be configured to cause the recirculation valve to increase the recirculation flow above the predetermined minimum recirculation flow as to allow for improved operation of a plant. That is, the override control signal may be used to override a signal provided by the differential-pressure flowmeter associated with the feedwater pump recirculation valve.

If, on the other hand, the flow calculated based on the pump motor power corresponds to the flow measured by the differential-pressure flowmeter, and both flows are below the predetermined minimum recirculation flow, correct operation of the differential-pressure flowmeter may be reported, in operation 340. In this case, the controller may provide a control signal to the feedwater pump recirculation to modify the recirculation pump flow.

Figure 4:
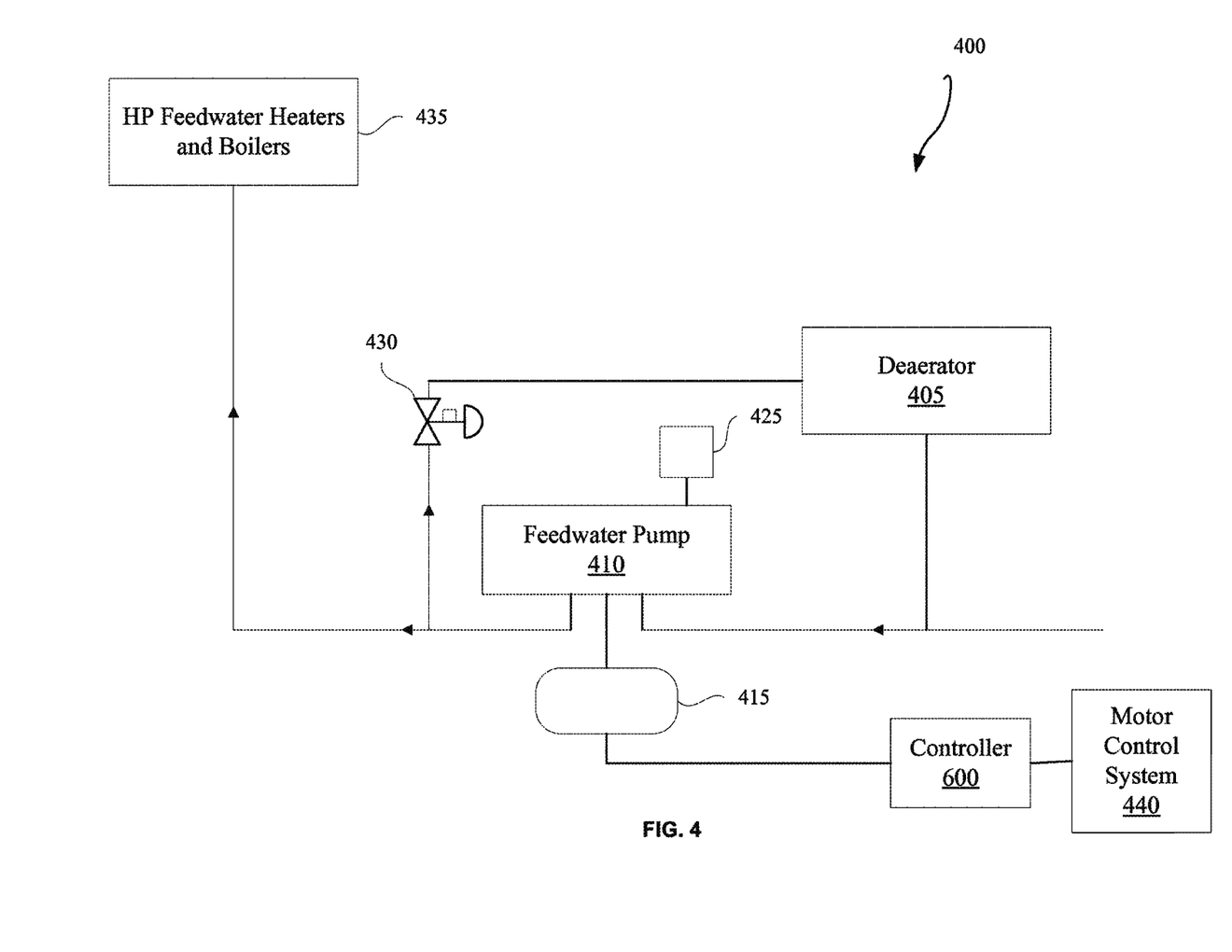
FIG. 4 depicts an example system for providing override control for a feedwater pump recirculation valve, in accordance with an embodiment of the disclosure.

FIG. 4 depicts an example system 400 for providing override control for a feedwater pump recirculation valve, in accordance with an embodiment of the disclosure. Feedwater may be supplied by a deaerator 405 to a feedwater pump 410. The feedwater pump 410 may include a rotor driven by a pump motor 415. The feedwater pump 410 may provide feedwater to high-pressure (HP) feedwater heaters and boilers 435. The feedwater pump 410 may be equipped with a feedwater pump recirculation valve 430, which recirculates water back to a condensate inlet of the deaerator 405. The feedwater pump 410 may be controlled and monitored by a controller 600. The controller 600 may regulate recirculation flow through the feedwater pump 410 to the HP feedwater heaters and boilers 435.

A motor control system 440 coupled to the controller 600 may periodically take measurements of pump motor power consumed during pump operation and provide the measurements to the controller 600. Based on the measured pump motor power, the actual flow developed by the feedwater pump 410 may be calculated and the calculated flow may be compared to a predetermined minimum recirculation flow value. The calculated flow may then be compared to a flow measured by a differential-pressure flowmeter 425. Based at least in part on these comparisons, the controller 600 may selectively provide an override control signal to the feedwater pump recirculation valve 430 to modify the recirculation flow.

Figure 5:
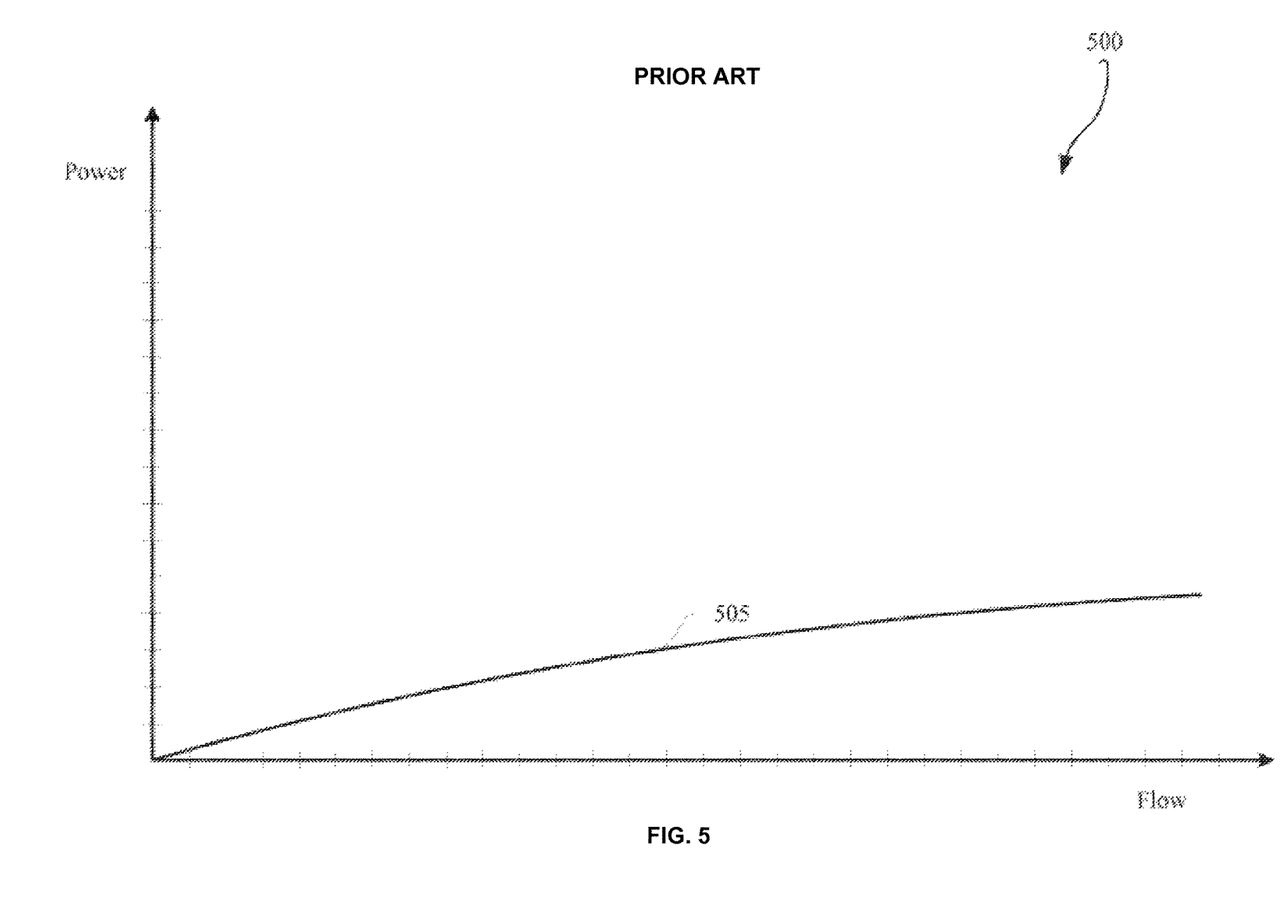
FIG. 5 depicts an example characteristic curve of power versus flow, in accordance with an embodiment of the disclosure.

FIG. 5 depicts an example characteristic curve of power versus flow, in accordance with an embodiment of the disclosure. According to the embodiment, the power-flow characteristic curve 505 represents the actual flow through a feedwater pump based on pump motor power measured by a motor control system. The calculation of the flow may be based on an interpolation function 500. The interpolation function 500 may comprise the pump motor power versus the recirculation flow. The interpolation function 500 may be stored in the memory of the controller preprogrammed with a characteristic curve of power versus flow, typically as provided by a pump manufacturer. As shown in FIG. 5, the interpolation function 500 may include a cubic interpolation function, wherein the power is cubically proportional to the flow.

Figure 6:
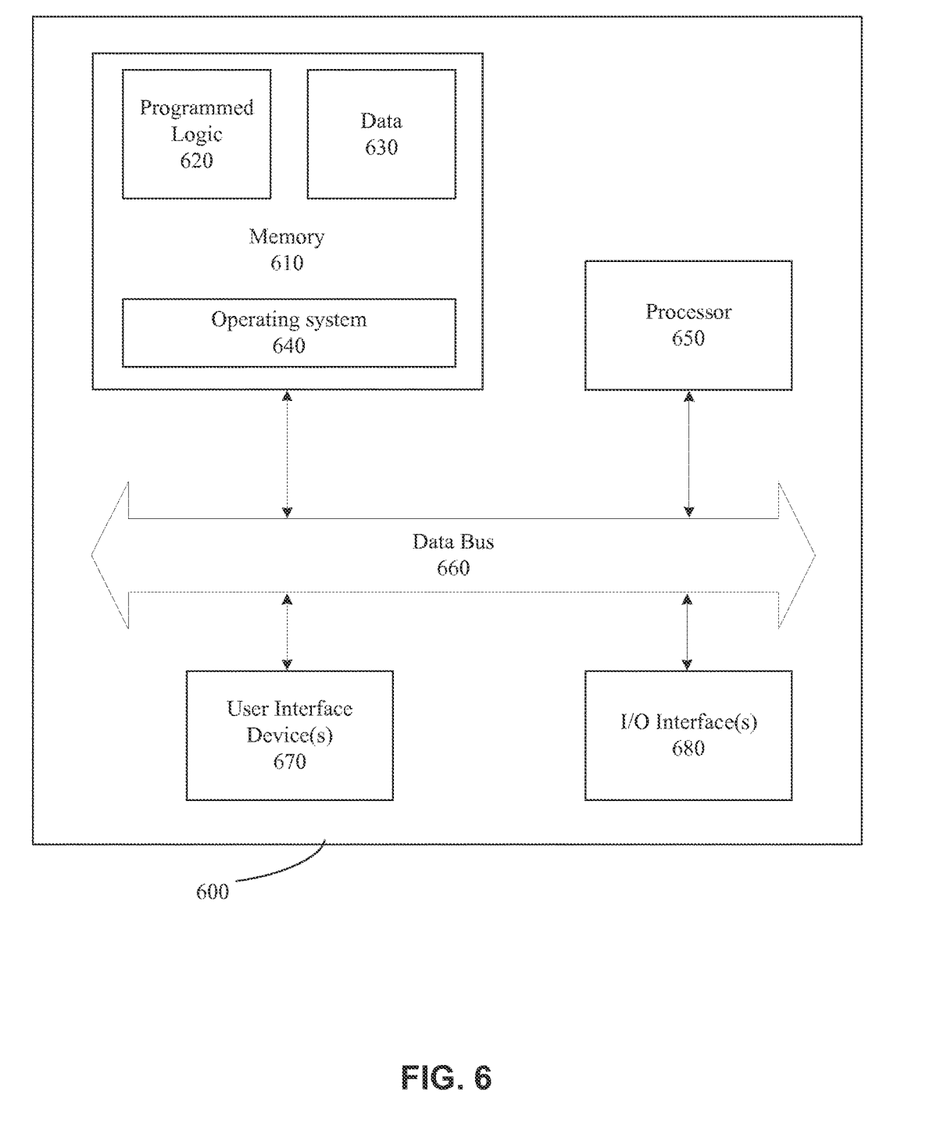
FIG. 6 depicts a block diagram illustrating a controller for controlling a generator, in accordance with an embodiment of the disclosure.

FIG. 6 depicts a controller 600 for providing override control for a feedwater pump recirculation valve, in accordance with an embodiment of the disclosure. More specifically, components of the controller 600 may be used to receive one or more measurements associated with pump motor power driving a feedwater pump flow, wherein the feedwater pump recirculation valve may be configured to maintain a predetermined minimum recirculation flow through the feedwater pump by regulating recirculation pump flow through a recirculation line, calculate, based at least in part on the one or more measurements, the recirculation pump flow, compare the recirculation pump flow to a predetermined minimum recirculation flow, and based at least in part on the comparing, selectively provide an override control signal to the feedwater pump recirculation valve to selectively modify the recirculation flow. The controller 600 may include a memory 610 for storing programmed logic 620 (e.g., software) and other data, such as, for example, measurements of pump motor power, recirculation flow, operational data associated with parameters of a feedwater pump, a status of a feedwater pump recirculation valve, and the like. The memory 610 may also include an operating system 640. A processor 650 may utilize the operating system 640 to execute the programmed logic 620, and in doing so, the operating system 640 may also utilize the data 630. A data bus 660 may provide communication between the memory 610 and the processor 650. Users may interface with the controller 600 via at least one user interface device 670 such as a keyboard, mouse, control panel, or any other devices capable of communicating data to and from the controller 600. The controller 600 may be in communication with the feedwater pump recirculation valve online while operating, as well as in communication with the feedwater pump recirculation valve offline while not operating, via an I/O Interface 680. More specifically, one or more of the controllers 600 may carry out methods described with reference to FIGS. 2-3 including receiving one or more measurements associated with the pump motor power driving a feedwater pump, wherein the feedwater pump recirculation valve may be configured to maintain a predetermined minimum recirculation flow through a recirculation line; calculating, based at least in part on the one or more measurements, the recirculation pump flow, comparing the recirculation pump flow to the predetermined minimum recirculation flow, and based at least in part on the comparing, selectively provide an override control signal to the feedwater pump recirculation valve to selectively modify the recirculation pump flow. Additionally, it should be appreciated by one reasonably skilled in the art that other external devices or feedwater pump recirculation valves may be in communication with the controller 600 via the I/O Interface 680. In the illustrated embodiment, the controller 600 may be located remotely with respect to the feedwater pump recirculation valve, although, it may be co-located or even integrated with the feedwater pump recirculation valve. Furthermore, the controller 600 and the programmed logic 620 implemented thereby may include software, hardware, firmware, or any combination thereof. It should also be appreciated that multiple controllers 600 may be used and different features described herein may be executed on one or more different controllers 600.

Accordingly, embodiments described herein may provide override control to the feedwater pump recirculation valve by measuring pump motor power. Based on the measurements, the actual recirculation flow through the feedwater pump may be calculated. Thus, a correct recirculation flow may be set and irregularities in feedwater pump operations avoided or otherwise minimized.

References are made to block diagrams of systems, methods, apparatuses, and computer program products according to example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based, or programmable consumer electronics, mini-computers, mainframe computers, etc.

Application programs that are components of the systems and methods described herein may include routines, programs, components, data structures, and so forth that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for providing override control for a feedwater pump recirculation valve, the system comprising:
    a controller configured to control a feedwater pump; and
    a processor communicatively coupled to the controller and configured to:
        receive a measured recirculation pump flow rate from a differential-pressure flowmeter, wherein the measured recirculation pump flow rate is a recirculation flow rate through the feedwater pump recirculation valve measured by the differential-pressure flowmeter;
        provide, by the controller, a control signal to the feedwater pump recirculation valve, wherein the feedwater pump recirculation valve regulates recirculation flow through a feedwater pump based on the measured recirculation pump flow rate to maintain a predetermined minimum recirculation flow rate through the feedwater pump;
        receive one or more measurements of a current and a voltage of a pump motor that drives feedwater pump flow, the current and voltage being indicative of a consumed electrical power, wherein the current is measured by at least one current transformer, the voltage is measured by at least one potential transformer and wherein the at least one current transformed and the at least one potential transformer are connected to a motor control system;
        based at least in part on the one or more measurements, identify an expected recirculation pump flow rate that corresponds to the one or more measurements using a predefined interpolation function;
        compare the expected recirculation pump flow rate with the predetermined minimum recirculation flow rate;
        if the expected recirculation pump flow rate is below the predetermined minimum recirculation flow, comparing the expected recirculation pump flow rate with the measured recirculation pump flow rate; and
        if the measured recirculation pump flow rate is higher than the expected recirculation pump flow rate, providing, by the controller, an override control signal to adjust a position of the feedwater pump recirculation valve and increase flow to above the predetermined minimum recirculation flow rate, wherein the override control signal overrides the control signal provided by the differential-pressure flowmeter.

2. The system of claim 1, wherein the consumed electrical power is detected by one or more transformers connected to the motor control system.

3. The system of claim 1, wherein the interpolation function comprises the consumed electrical power versus the recirculation flow.

4. The system of claim 1, wherein the override control signal is provided to a loop controller of the feedwater pump recirculation valve.

5. A system for providing override control for a feedwater pump recirculation valve, the system comprising:
    a feedwater pump;
    a controller configured to control the feedwater pump; and
    a processor communicatively coupled to the controller and configured to:
        receive a measured recirculation pump flow rate from a differential-pressure flowmeter, wherein the measured recirculation pump flow rate is a recirculation flow rate through the feedwater pump recirculation valve measured by the differential-pressure flowmeter;
        provide, by the controller, a control signal to the feedwater pump recirculation valve, wherein the feedwater pump recirculation valve regulates recirculation flow through a feedwater pump based on the measured recirculation pump flow rate to maintain a predetermined minimum recirculation flow rate through the feedwater pump;

receive one or more measurements of a current and a voltage of a pump motor that drives feedwater pump flow, the current and voltage being indicative of a consumed electrical power;

based at least in part on the one or more measurements, identify an expected recirculation pump flow rate that corresponds to the one or more measurements using a predefined interpolation function;

determine that measured recirculation pump flow rate is above the expected recirculation flow rate; and provide an override control signal to adjust a position of the feedwater pump recirculation valve to increase the recirculation flow above the predetermined minimum recirculation flow rate, wherein the override control signal overrides the control signal provided by the differential-pressure flowmeter.

6. The system of claim 5, wherein the consumed electrical power is detected by one or more transformers connected to the motor control system.

7. The system of claim 5, wherein the interpolation function comprises the consumed electrical power versus the recirculation flow.

8. The system of claim 5, wherein the override control signal is provided to a loop controller of the feedwater pump recirculation valve.

9. The system of claim 1, wherein the interpolation function is stored in a memory associated with the controller.

10. The system of claim 5, wherein the interpolation function is stored in a memory associated with the controller.

11. The system of claim 1, wherein the interpolation function may comprise a cubic function, wherein the consumed electrical power is cubically proportional to the recirculation flow.

12. The system of claim 5, wherein the interpolation function may comprise a cubic function, wherein the consumed electrical power is cubically proportional to the recirculation flow.

* * * * *